US010185966B2

(12) United States Patent
Wenger et al.

(10) Patent No.: US 10,185,966 B2
(45) Date of Patent: Jan. 22, 2019

(54) CLAIMING INCENTIVES ON NETWORKED TELEVISIONS

(71) Applicant: PAYPAL, INC., San Jose, CA (US)

(72) Inventors: Mark Wenger, Austin, TX (US); Prashant Jamkhedkar, Sunnyvale, CA (US)

(73) Assignee: PAYPAL, INC., San Jose, CA (US)

( * ) Notice: Subject to any disclaimer, the term of this patent is extended or adjusted under 35 U.S.C. 154(b) by 476 days.

(21) Appl. No.: 14/227,920

(22) Filed: Mar. 27, 2014

(65) Prior Publication Data
US 2014/0297380 A1    Oct. 2, 2014

Related U.S. Application Data

(60) Provisional application No. 61/805,894, filed on Mar. 27, 2013.

(51) Int. Cl.
*G06Q 30/00* (2012.01)
*G06Q 30/02* (2012.01)
*H04N 21/4784* (2011.01)

(52) U.S. Cl.
CPC ..... *G06Q 30/0215* (2013.01); *H04N 21/4784* (2013.01)

(58) Field of Classification Search
CPC ............... G06Q 30/02; G06Q 30/0207; G06Q 30/0215; G06Q 30/0236;
(Continued)

(56) References Cited

U.S. PATENT DOCUMENTS

| 7,933,799 B2 * | 4/2011 | Aaltonen | ......... G06Q 20/35785 705/14.1 |
| 8,392,940 B2 * | 3/2013 | Beyabani | ............... G06Q 30/02 705/14.1 |

(Continued)

FOREIGN PATENT DOCUMENTS

| CN | 1904929 | 1/2007 | |
| JP | 2004326199 A | * 11/2004 | ............. G06F 17/60 |

OTHER PUBLICATIONS

IFC. Mobile Financial Services Its role in banks and in the market. (Jan. 2014). https://www.ifc.org/wps/wcm/connect/5e24430042b925809415bc0dc33b630b/M-Banking_Workshop_Presentation_Jan28-2014_ENG.pdf?MOD=AJPERES. Retrieved online Sep. 1, 2018 (Year: 2014).*

*Primary Examiner* — James A Reagan
(74) *Attorney, Agent, or Firm* — Haynes & Boone, LLP

(57) ABSTRACT

Systems and methods described herein may enable a user to add an incentive displayed along with content on a networked television to a digital wallet associated with the user. The user may be capable of selecting the displayed incentive using a remote control in communication with the networked television, or using their mobile device which may be in direct communication with the networked television, or in communication with the networked television over a network. When the user selects the displayed incentive for storage in a digital wallet, the user may be prompted to authenticate to a provider associated with the digital wallet, wherein the authentication may be performed through the networked television using the remote control. The incentive may then be added to the user's digital wallet and may be used or applied when the user performs a transaction using the digital wallet.

20 Claims, 8 Drawing Sheets

(58) Field of Classification Search
CPC ......... G06F 21/31–21/44; H04N 5/335; H04N 5/44543; H04N 21/812; H04N 21/4622
USPC .......... 705/14.1, 14.17, 14.36; 713/182–186; 725/23, 32, 43, 51–52, 60
See application file for complete search history.

(56) References Cited

U.S. PATENT DOCUMENTS

| | | | |
|---|---|---|---|
| 8,573,492 B2* | 11/2013 | Mesaros | G06Q 30/0207 235/383 |
| 8,635,155 B2* | 1/2014 | Lawson | G06Q 20/102 705/35 |
| 8,739,201 B2* | 5/2014 | Malik | H04N 21/4126 725/135 |
| 8,769,559 B2* | 7/2014 | Moon | H04N 7/17318 725/10 |
| 2002/0120927 A1 | 8/2002 | Harada et al. | |
| 2005/0229226 A1* | 10/2005 | Relan | H04H 60/33 725/114 |
| 2006/0100929 A1* | 5/2006 | Spector | G06Q 30/02 705/14.13 |
| 2008/0097851 A1* | 4/2008 | Bemmel | G06Q 30/02 705/14.36 |
| 2010/0256976 A1 | 10/2010 | Atsmon et al. | |
| 2011/0184804 A1* | 7/2011 | Sontag | G06F 21/335 705/14.49 |
| 2012/0095819 A1* | 4/2012 | Li | G06Q 30/02 705/14.23 |
| 2013/0179250 A1* | 7/2013 | Nguyen | G06Q 20/387 705/14.36 |
| 2013/0262315 A1* | 10/2013 | Hruska | G06Q 20/227 705/67 |

\* cited by examiner

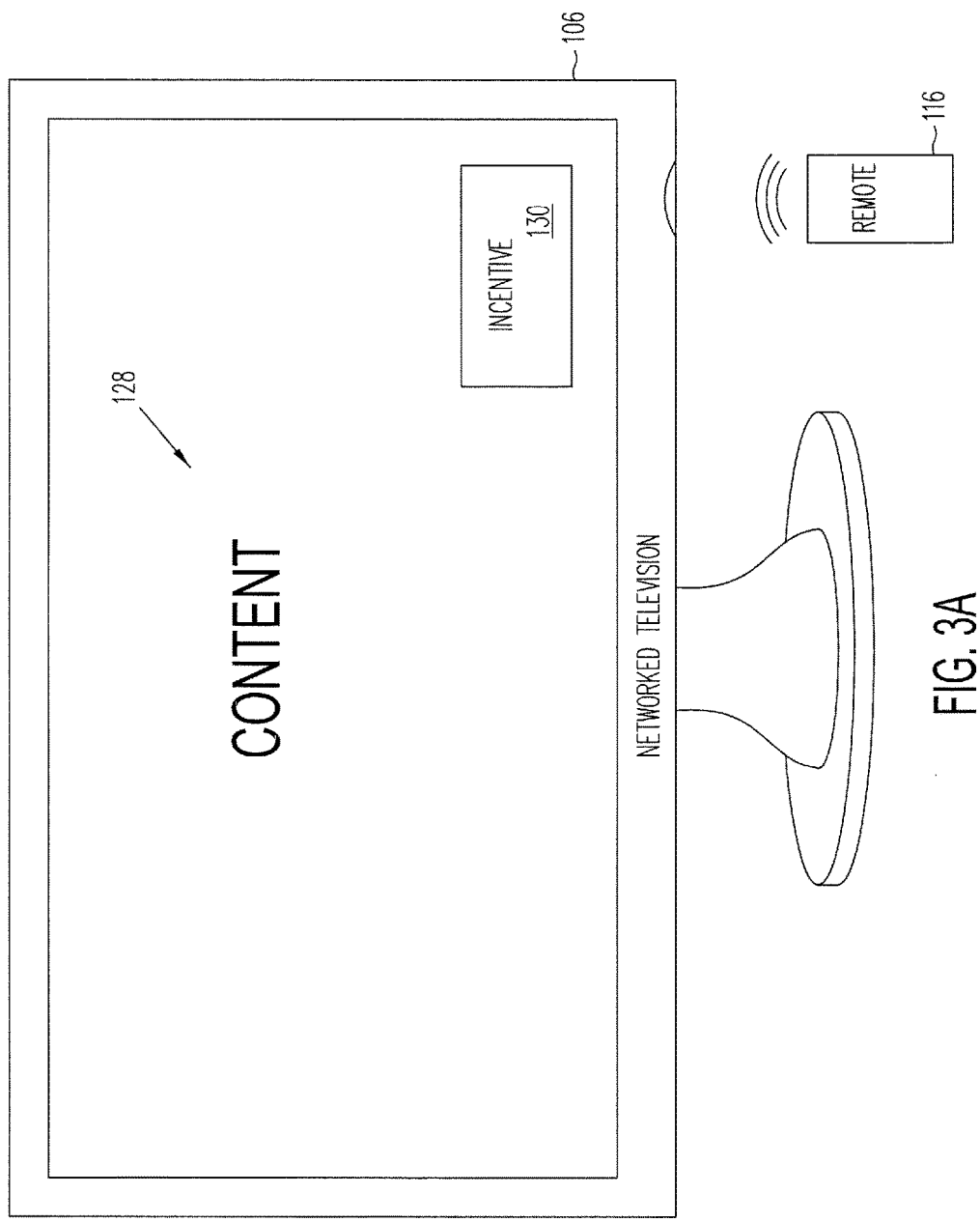

CLAIMING INCENTIVES ON NETWORKED TELEVISIONS

CROSS REFERENCE TO RELATED APPLICATIONS

Pursuant to 35 U.S.C. § 119(e), this application claims priority to the filing date of U.S. Provisional Patent Application No. 61/805,894, filed on Mar. 27, 2013, the disclosure of which is hereby incorporated by reference in its entirety.

BACKGROUND

Technical Field

Embodiments disclosed herein are related to claiming incentives displayed on a networked or "smart" television.

Related Art

"Smart" or networked televisions, which is a name describing any television that may be capable of running applications and receiving data over a network, are increasing in use providing another device through which a user may consume content. In addition, networked televisions provide an additional audience to which incentives in the form of offers or advertisements may be provided. When a user watching a networked television sees an incentive that is of interest, the user currently may need to use a mobile device or desktop computer to visit a website associated with the incentive to claim and use the incentive. Due to the additional steps required to be able to claim and use the incentive, a user may be discouraged from acting on the incentive, which could lead to lower return on the expense involved in purchasing, preparing, and displaying the incentive. Further, many incentives may require the user to print out the incentive or an e-mail associated with the incentive to be able to use it, which is another step that a user must take in order to claim and use the incentive.

BRIEF DESCRIPTION OF THE FIGURES

FIGS. 3A-3C are diagrams illustrating and example of a user selecting an incentive displayed on a networked television for adding to a digital wallet associated with the user, consistent with some embodiments.

DETAILED DESCRIPTION

In the following description specific details are set forth describing certain embodiments. It will be apparent, however, to one skilled in the art that the disclosed embodiments may be practiced without some or all of these specific details. The specific embodiments presented are meant to be illustrative, but not limiting. One skilled in the art may realize other material that, although not specifically described herein, is within the scope and spirit of this disclosure.

There is a need for systems and methods for allowing a user to claim an incentive displayed on a smart or networked television through the television using a remote control and providing the user with a way to store and later use the claimed incentive.

Consistent with some embodiments, there is provided a system. The system includes one or more processors configured to prepare an authentication request in response to receiving a request to store an incentive in a digital wallet associated with a user account, wherein the incentive is an incentive viewed by the user on a television, and store the incentive in the digital wallet when an authentication response is successful. The system also includes a network interface component configured to send the authentication response and receive the request to store the incentive and the authentication response over a network, and a memory storing the digital wallet associated with the user.

Consistent with some embodiments, there is also provided a method. The method includes steps of receiving a request from a television over a network to store an incentive in a digital wallet associated with a user account, wherein the incentive is an incentive viewed by the user on the television, sending an authentication request to the television over the network, receiving an authentication response, storing the incentive in the digital wallet when the received authentication response is successful, and sending a notification to the user when the incentive is stored in the digital wallet. The method may be embodied in computer-readable media.

Consistent with some embodiments, there is further provided a method including steps of receiving a request from a television over a network to claim an incentive presented on the television, receiving user authentication information entered by the user through the television, and storing the incentive in a user account associated with the service provider when the received user authentication information matches user authentication information associated with the service provider. The method may be embodied in computer-readable media.

Embodiments consistent with this disclosure may provide systems and methods that allow a user to claim an incentive through a networked television using a remote control and add the incentive to a digital wallet or other account associated with a service provider through which the user can later use or redeem the incentive.

Figure 1:
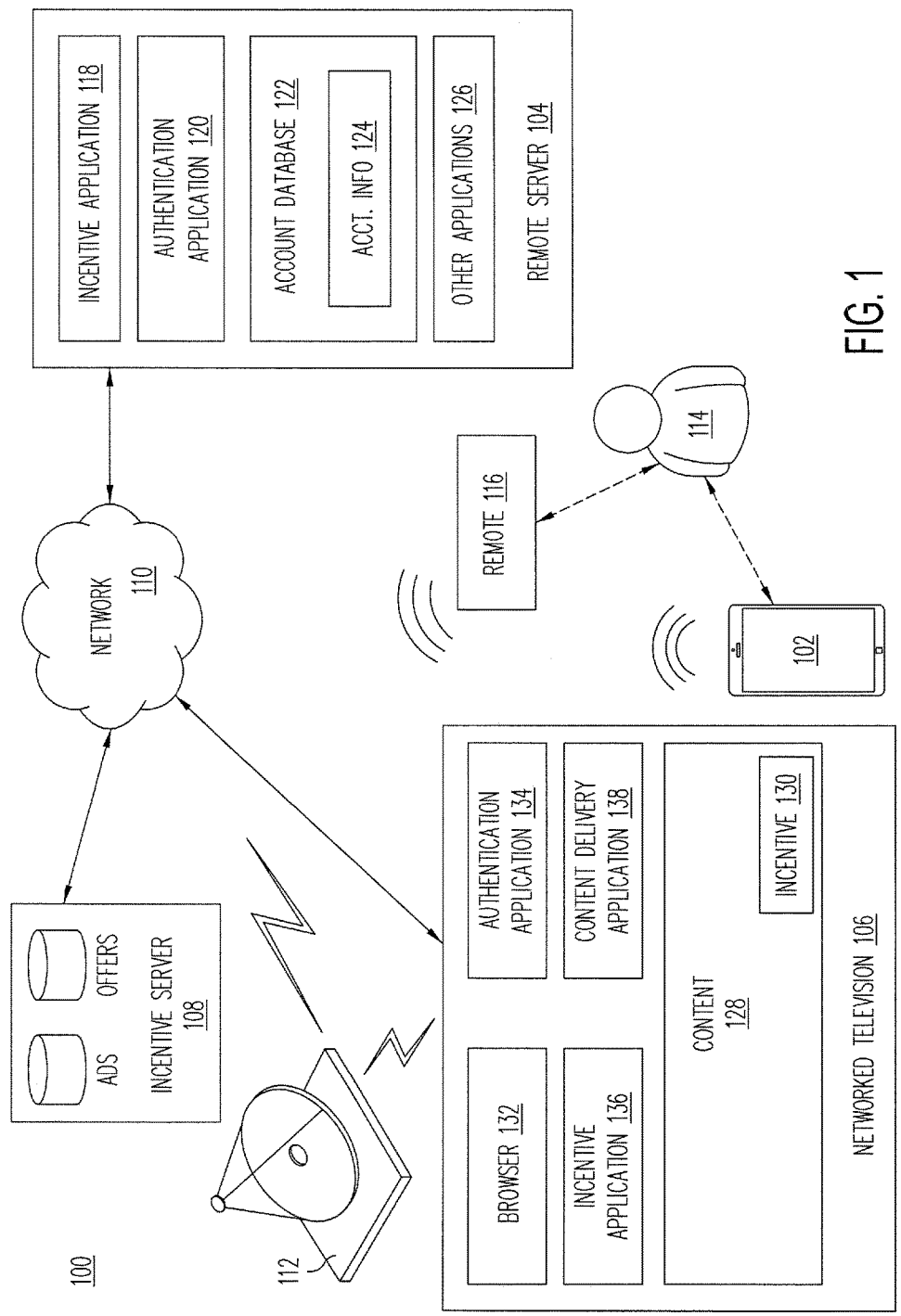
FIG. 1 is a block diagram of a networked system, consistent with some embodiments.

FIG. 1 is a block diagram of a networked system 100, consistent with some embodiments. System 100 includes a client computing device 102, a remote server 104, a networked television 106, and an incentive server 108 storing advertisements, offers, and other incentives, in communication over a network 110. System 100 may also include a content provider 112, which may be in communication with networked television 106 over network 110 or through satellite, cable, or other communications protocols in which content may be provided to a television such as a networked television. A user 114 may be associated with client computing device 102, and user 114 may have or be associated with a remote control 116 in communication with networked television over a wired or wireless communications protocol. User 114 may use remote control 116 to control networked television 106 and interact with networked television 106. Remote control 116 may be a dedicated remote control for the television, a more generalized remote control for the television and other user devices, or a device that remote controls the television but also has other functionality, such as a smart phone or computing tablet.

Remote server 104 may be a hosting server that hosts webpages and other online content accessible by user 114 using client computing device 102 over network 110. In some embodiments, remote server 104 may correspond to an online marketplace server where users such as user 114 can buy and sell goods, services, and items (collectively referred to as "items"), such as may be provided by eBay Inc. of San Jose, Calif. Remote server 104 may also correspond to one or more online payment processing servers, such as may be provided by PayPal, Inc., of San Jose, Calif. Remote server 104 may be maintained by other service providers in different embodiments. In some embodiments, remote server 104 may correspond to a payment service processing server and also host merchant-specific content. Moreover, remote server 104 may correspond to one or more servers in some embodiments.

Network 110, in one embodiment, may be implemented as a single network or a combination of multiple networks. For example, in various embodiments, network 110 may include the Internet and/or one or more intranets, landline networks, wireless networks, and/or other appropriate types of communication networks. In another example, the network may comprise a wireless telecommunications network (e.g., cellular phone network) adapted to communicate with other communication networks, such as the Internet.

Client computing device 102, in one embodiment, may be implemented using any appropriate combination of hardware and/or software configured for wired and/or wireless communication over network 110. For example, client computing device 102 may be implemented as a wireless telephone (e.g., smart phone), tablet, personal digital assistant (PDA), notebook computer, personal computer, a connected set-top box (STB) such as provided by cable or satellite content providers, or a video game system console, a head-mounted display (HMD) or other wearable computing device, including a wearable computing device having an eyeglass projection screen, and/or various other generally known types of computing devices.

Client computing device 102 may include any appropriate combination of hardware and/or software having one or more processors and capable of reading instructions stored on a tangible non-transitory machine-readable medium for execution by the one or more processors. Consistent with some embodiments, client computing device 102 includes a machine-readable medium, such as a memory (not shown) that includes instructions for execution by one or more processors (not shown) for causing client computing device 102 to perform specific tasks. In some embodiments, the instructions may be executed by the one or more processors in response to interaction by a user 114. The instructions may include applications for browsing the internet, interacting with networked television 106, remote server 104, and other servers. The instructions may further include applications for paying for goods and services, the payment being processed by remote server 104. Client computing device 102 may further include other applications as may be desired in one or more embodiments to provide additional features available to user 114, including accessing a user account with remote server 104. For example, applications 114 may include interfaces and communication protocols that allow the user to receive and transmit information through network 110 and to remote server 104 and other online sites. Other applications may also include security applications for implementing client-side security features, programmatic client applications for interfacing with appropriate APIs over network 110 or various other types of generally known programs and/or applications.

Remote server 104 may be maintained by a provider providing an online marketplace, such as eBay Inc. of San Jose, Calif., or by an online payment processing provider, such as PayPal, Inc., of San Jose, Calif. Remote server 104 may include an incentive application 118 and an authentication application 120. In some embodiments, incentive application 118 may include instructions that may cause remote server 104 to receive a request to store an incentive displayed on networked television in a digital wallet associated with user 114. Moreover, incentive application 118 may include instructions for determining incentive details from information provided to remote server 104 by networked television 106, the information including programming metadata, a hyperlink or Uniform Resource Locator (URL) associated with the incentive, or a screenshot or other image of the displayed incentive. Authentication application 120 may include instructions that may cause remote server 104 to send an authentication request and determine if an authentication response is successful.

Remote server 104 may further include an account database 122 that includes account information 124 for users having an account on remote server 104, such as user 114. Account information 124 in account database 122 may also include a digital wallet associated with user 114, as well as user credentials that may be used by authentication application 120 to determine if an authentication response is successful. Remote server 104 may include other applications 124 providing other functionalities. In some embodiments, remote server 104 may allow user 114 to store an incentive in a digital wallet associated with the provider hosted by remote server 104 and then use, redeem, and/or apply the incentive when performing a transaction processed by remote server 104.

Networked television 106 may be any display device having appropriate hardware and software capable of displaying content 128, one or more incentives 130, and communicating over network 110. In some embodiments, networked television 106 may be a "Smart TV", and have one or more applications installed thereon. Applications installed on networked television 106 may include a browser application 132, an authentication application 134, an incentive application 136, and a content delivery application 138. Additional applications may be installed on networked television 106 in some embodiments.

In some embodiments, content 128 may be received from content provider 112 and/or from a content server (not shown) over network 106. Incentive 130 may be overlaid on top of content 128. In some embodiments, content provider 112 may receive ads, offers, or other incentives from incentive server 108, and insert these incentives into content that is provided to networked television 106, where content delivery application 138 may include instructions for displaying the received content 128 and incentives 130. In some embodiments, networked television 106 may receive incentives 130 from incentive server 108 over network 106, such that incentive application 136 may include instructions for requesting and receiving the incentive, and then overlaying the received incentive over content 128 to display to user 114. In some embodiments, content 128 may include one or more metadata tags that may correspond to incentives such that networked television 106 may detect these metadata tags and display a corresponding incentive. The incentive 130 and/or content 128 may include associated metadata that may be parsed by incentive application 136 to determine details of incentive 130. In some embodiments, incentive 130 may include a hyperlink or URL that may be displayed to user 114 so that user 114 may claim incentive 130 or learn more information associated with the incentive. In such embodiments, incentive application 136 may include instructions for claiming via the hyperlink or URL, or obtaining incentive details from the URL or hyperlink. In some embodiments, incentive application 136 may be capable of capturing an image of incentive 130 and analyzing the captured image for incentive details.

In some embodiments, user 114 may want to claim incentive 130 displayed on networked television 106 and have incentive 130 added to a digital wallet associated with an account stored in account information 124 of remote server 104. User 114 may user remote 116 to select incentive 130 from networked television 106 and indicate that they want to add the incentive to their digital wallet. In addition to remote 116, user 114 may be capable of selecting displayed incentive 130 using client computing device 102 which may be in direct communication with networked television 106, or may be in communication with networked television 106 over network 110. If networked television 106 includes a touch screen, user 114 may be capable of selecting incentive using the touch screen. User 114 may then be able to authenticate with remote server 104 through networked television 106 to add incentive 130 to a digital wallet, as explained in greater detail below.

Although discussion has been made of applications on client computing device 102, remote server 104, and networked television 106, the applications may also be, in some embodiments, modules. Module, as used herein, may refer to a software module that performs a function when executed by one or more processors or Application Specific Integrated Circuit (ASIC) or other circuit having memory and at least one processor for executing instructions to perform a function, such as the functions described as being performed by the applications. Moreover, although the example shown in FIG. 1 refers to claiming incentive 130 displayed on networked television 106, the example may be extended to other devices capable of receiving content 128, displaying content 128, overlaying incentive 130, and processing a request to add incentive 130 to a digital wallet. Such devices include, but are not limited to, a monitor of a desktop computing system, a laptop screen, a tablet computer, a smart phone, and wearable devices, such as a smart watch and a head mounted display (HMD).

Figure 2:
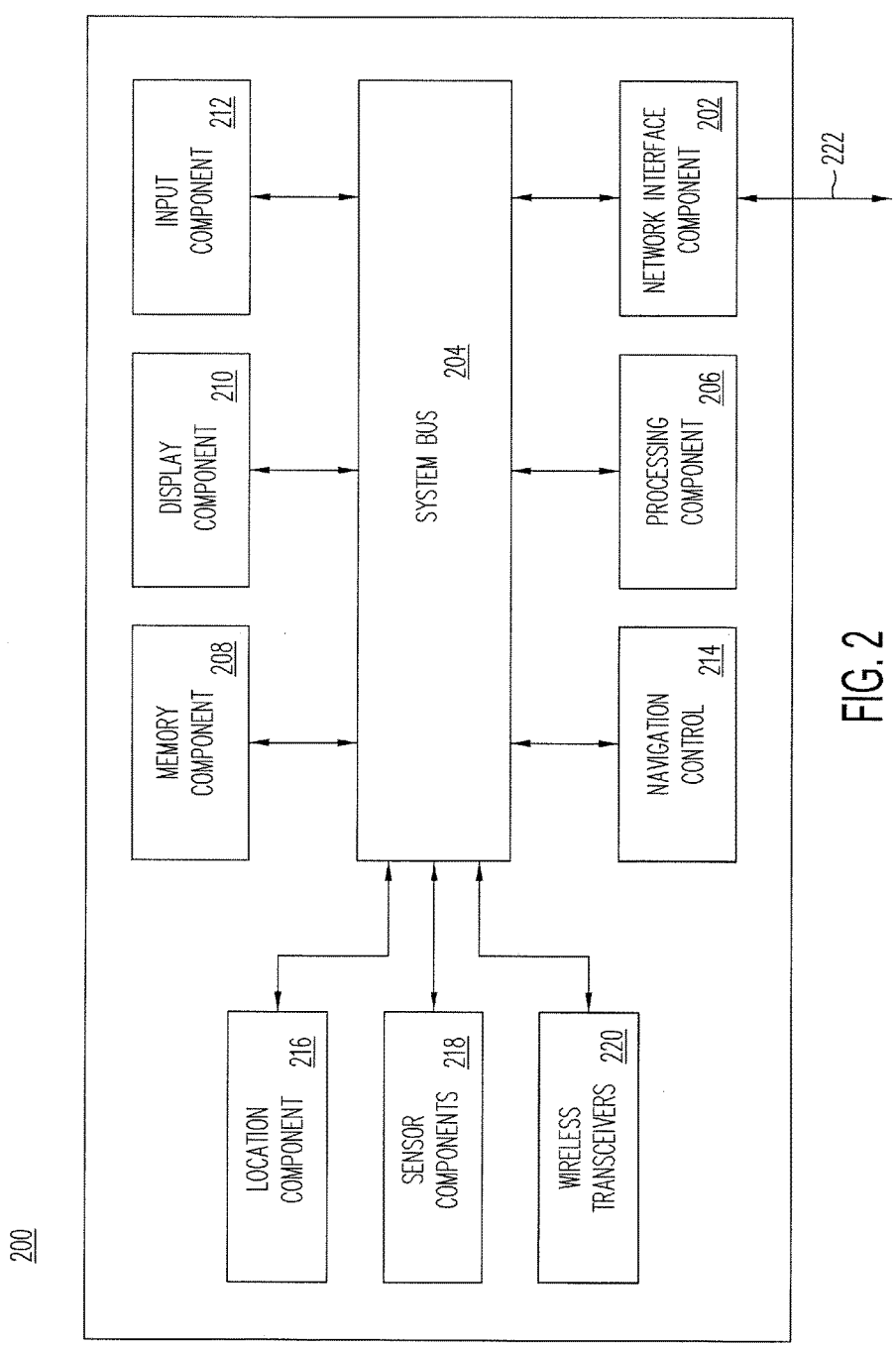
FIG. 2 is a diagram illustrating a computing system, consistent with some embodiments.

FIG. 2 is a diagram illustrating computing system 200, which may correspond to any of client computing device 102, remote server 104, networked television 106, or incentive server 108, consistent with some embodiments. Computing system 200 may be a mobile device such as a smartphone, a tablet computer, a personal computer, laptop computer, netbook, or tablet computer, set-top box, video game console, head-mounted display (HMD) or other wearable computing device as would be consistent with client computing device 102. Moreover, computing system 200 may also be a television capable of executing applications and communicating over network 110, as would be consistent with networked television 106. Further, computing system 200 may also be a server or one server amongst a plurality of servers, as would be consistent with remote server 104 or incentive server 108. As shown in FIG. 2, computing system 200 includes a network interface component (NIC) 202 configured for communication with a network such as network 110 shown in FIG. 1. Consistent with some embodiments, NIC 202 includes a wireless communication component, such as a wireless broadband component, a wireless satellite component, or various other types of wireless communication components including radio frequency (RF), microwave frequency (MWF), and/or infrared (IR) components configured for communication with network 110. Consistent with other embodiments, NIC 202 may be configured to interface with a coaxial cable, a fiber optic cable, a digital subscriber line (DSL) modem, a public switched telephone network (PSTN) modem, an Ethernet device, and/or various other types of wired and/or wireless network communication devices adapted for communication with network 110.

Consistent with some embodiments, computing system 200 includes a system bus 204 for interconnecting various components within computing system 200 and communicating information between the various components. Such components include a processing component 206, which may be one or more processors, micro-controllers, graphics processing units (GPUs) or digital signal processors (DSPs). Computing system 200 may also include a memory component 208, which may correspond to a random access memory (RAM), an internal memory component, a read-only memory (ROM), or an external or static optical, magnetic, or solid-state memory. Memory component 208 of remote server 104 may correspond to one or more databases including account database 122, in some embodiments. Consistent with some embodiments, computing system 200 further includes a display component 210 for displaying information to a user 114 of computing system 200. Display component 210 may be a liquid crystal display (LCD) screen, an organic light emitting diode (OLED) screen (including active matrix AMOLED screens), an LED screen, a plasma display, or a cathode ray tube (CRT) display. In some embodiments, processing component may be configured to render information for display by display component 210. The rendered information may include a user interface, graphics, and the like. In some embodiments, the rendered information may include content 128 and incentives 130. Computing system 200 may also include an input component 212, allowing for a user of computing system 200, such as user 114, to input information to computing system 200. Such information could include payment information such as an amount required to complete a transaction, account information, authentication information such as a credential, or identification information. An input component 212 may include, for example, a keyboard or key pad, whether physical or virtual. In some embodiments, remote control 116 may also correspond to an external input component 212 for networked television 106. Computing system 200 may further include a navigation control component 214, configured to allow a user to navigate along display component 210. Consistent with some embodiments, navigation control component 214 may be a mouse, a trackball, or other such device. Moreover, if computing system 200 includes a touch screen, display component 210, input component 212, and navigation control 214 may be a single integrated component, such as a capacitive sensor-based touch screen.

Computing system 200 may further include a location component 216 for determining a location of computing system 200. In some embodiments, location component 216 may correspond to a GPS transceiver that is in communication with one or more GPS satellites. In other embodiments, location component 216 may be configured to determine a location of computing system 200 by using an internet protocol (IP) address lookup, or by triangulating a position based on nearby telecommunications towers or wireless access points (WAPs). Location component 216 may be further configured to store a user-defined location in memory component 208 that can be transmitted to a third party for the purpose of identifying a location of computing system 200. Computing system 200 may also include sensor components 218. Sensor components 218 provide sensor functionality, and may correspond to sensors built into client computing device 102 or sensor peripherals coupled to client computing device 102. Sensor components 218 may include any sensory device that captures information related to user 110 and/or client computing device 102 that may be associated with any actions that user 110 performs using client computing device 102. Sensor components 218 may include camera and imaging components, accelerometers, biometric readers, GPS devices, motion capture devices, and other devices that are capable of providing information about client computing device 102 or user 110, or an environment therearound. Computing system 200 may also include one or more wireless transceivers 220 that may each include an antenna that is separable or integral and is capable of transmitting and receiving information according to one or more wireless network protocols, such as Wi-Fi™, 3G, 4G, LTE, RF, NFC, IEEE 802.11a, b, g, n, ac, or ad, Bluetooth®, BLE, WiMAX, ZigBee®, ANT or ANT+, etc.

Computing system 200 may perform specific operations by processing component 206 executing one or more sequences of instructions contained memory component 208, with such instructions possibly corresponding to one or more applications described in FIG. 1. In other embodiments, hard-wired circuitry may be used in place of or in combination with software instructions to implement the present disclosure. Logic may be encoded in a computer readable medium, which may refer to any medium that participates in providing instructions to processing component 206 for execution, including memory component 208. Consistent with some embodiments, the computer readable medium is tangible and non-transitory. In various implementations, non-volatile media include optical or magnetic disks, volatile media includes dynamic memory, and transmission media includes coaxial cables, copper wire, and fiber optics, including wires that comprise system bus 204. Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by computing system 200. In various other embodiments of the present disclosure, a plurality of computing systems 200 coupled by a communication link 222 to network 110 (e.g., such as a LAN, WLAN, PTSN, and/or various other wired or wireless networks, including telecommunications, mobile, and cellular phone networks) may perform instruction sequences to practice the present disclosure in coordination with one another. Computing system 200 may transmit and receive messages, data and one or more data packets, information and instructions, including one or more programs (i.e., application code) through communication link 222 and network interface component 202 and wireless transceiver 220. Received program code may be executed by processing component 206 as received and/or stored in memory component 208.

Figure 3B:
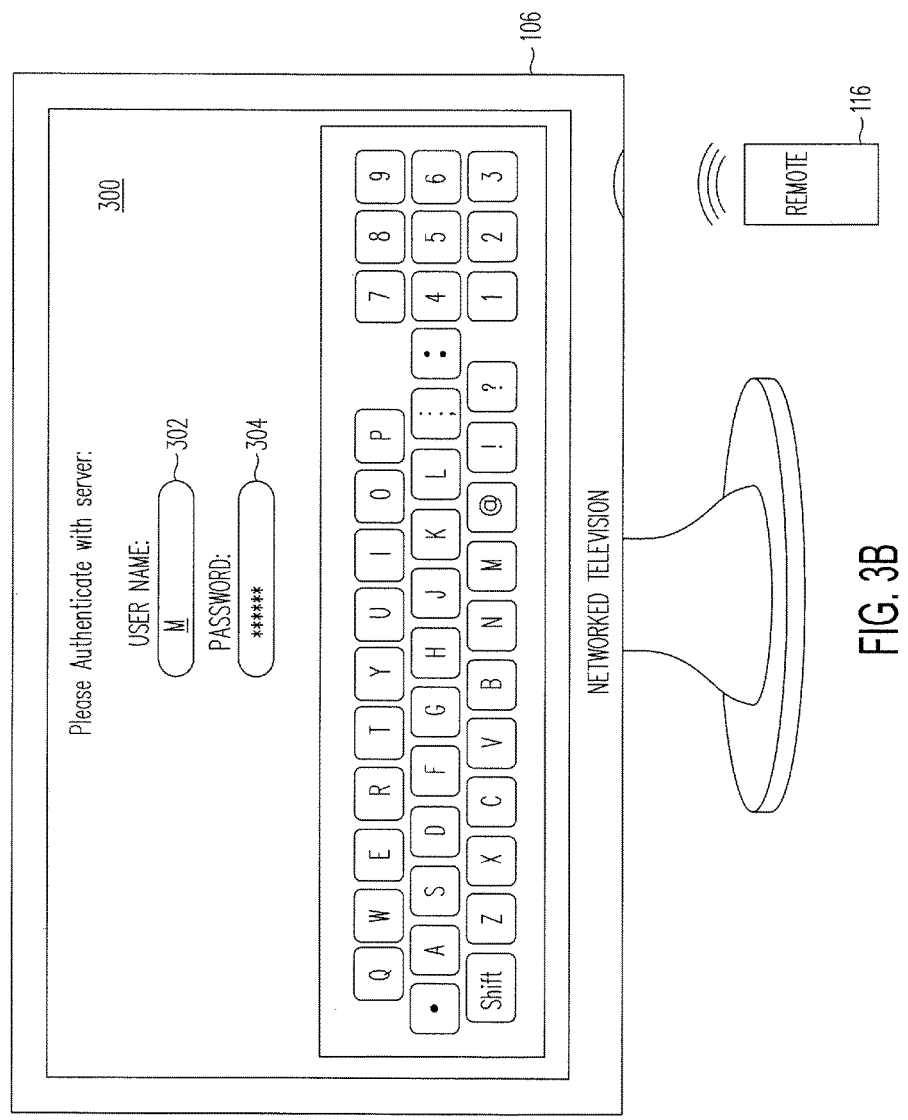
Figure 3C:
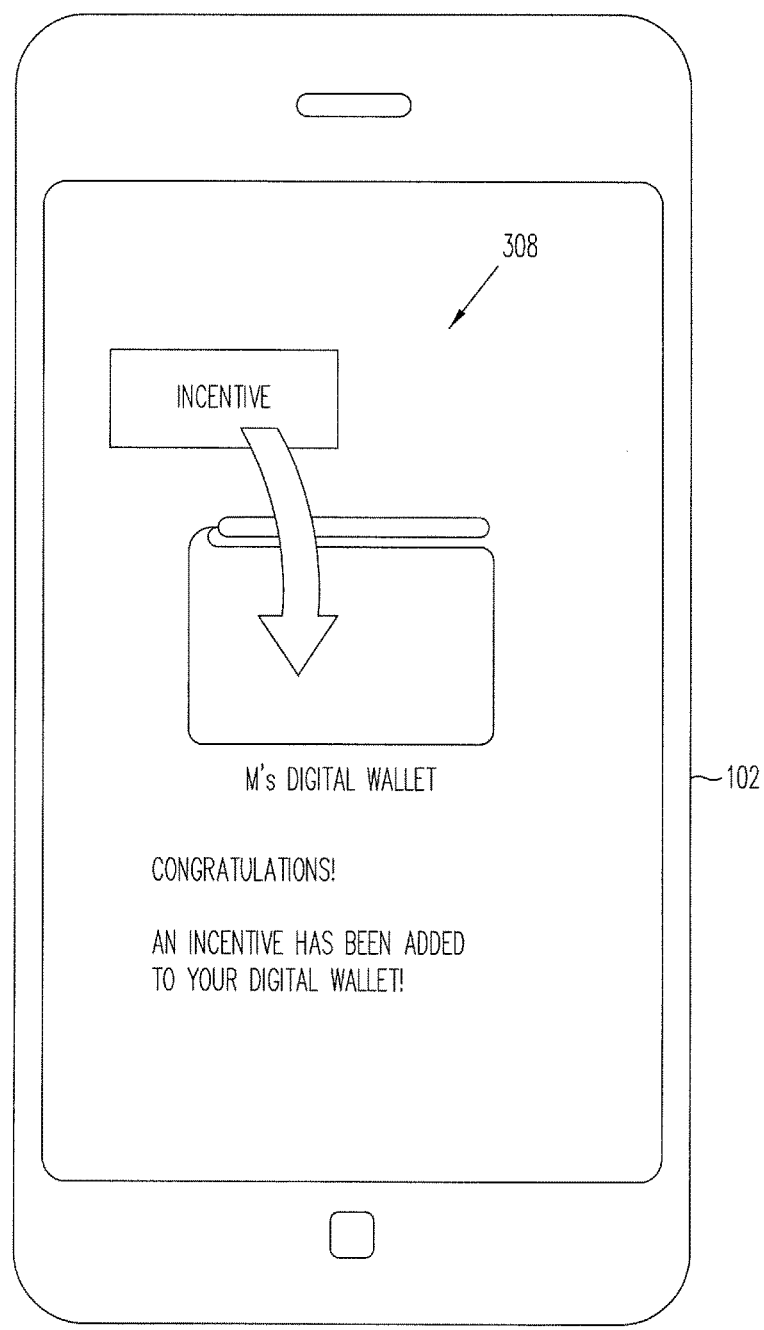

FIGS. 3A-3C are diagrams illustrating an example of user 114 selecting incentive 130 displayed on networked television 106 for adding to a digital wallet associated with user, consistent with some embodiments. As shown in FIG. 3A, networked television 106 may display content 128 received from content provider 112 or from network 110. Incentive 130 may be received from incentive server 108 or from network 110, and may be displayed overlaying content 128 or as part of content 128. User 114 may want to claim incentive 130 and add incentive 130 to a digital wallet or other online account associated with user 114. User 114 may then use remote control 116, for example, to select incentive 130 and request that incentive 130 be added to a digital wallet or other account associated with user 114. In some embodiments, when user 114 requests that incentive be added to a digital wallet or other account associated with user 114, networked television 106 may send a request over network 106 to remote server 104 which may host the digital wallet or other account. Remote server 104 may then send an authentication request to networked television 106.

As shown in FIG. 3B, when networked television 106 receives the authentication request from remote server 104, authentication application 134 of networked television 106 may include instructions for displaying authentication interface 300 to user 114. In some embodiments, authentication interface 300 may include a user name entry field 302 and a password entry field 304. More or less credentials may be included in authentication interface 300 in other embodiments. In some embodiments, user 114 may link an account with remote server 104 with an account associated with networked television 106 such that once user 114 has tied or otherwise associated the accounts, authentication interface 300 may display entry fields for the account associated with networked television 106, which may be a less secure credential such as a personal identification number (PIN). Authentication interface 300 may also include a virtual keyboard 306 for user 114 to use when entering a user name, password, or other credentials. In some embodiments, user 114 may be capable of using remote 116 to select keys of virtual keyboard 306 and enter letters and numbers from keyboard 306 into fields 302 and 304. In embodiments when networked television 106 includes a touch screen, user 114 may be capable of touching individual keys of virtual keyboard 206 to enter credentials into fields 302 and 304.

After user 114 has entered credentials into authentication interface 300, user 114 may submit the entered credentials, and networked television 106 may send the credentials over network 110 to remote server 104. Authentication application 120 of remote server 104 may then determine if the received credentials match authentication credentials associated with user 110, including authentication credentials that may be stored in account information 124 of account database 122. When authentication application 120 determines that the received credentials match stored credentials, or otherwise determines that the authentication is successful, incentive application 118 may include instructions for adding incentive 130 into a digital wallet associated with user 114. In some embodiments, incentive application 118 may include instructions for parsing metadata associated with incentive 130 to determine details of incentive 130 to add to the digital wallet of user 114. In some embodiments, incentive application 118 may include instructions for using a hyperlink or URL associated with incentive 130 to claim incentive 130 and add incentive 130 to the digital wallet of user 114. In some embodiments, incentive application 118 may include instructions for analyzing a captured image of incentive 130 to determine incentive details to add to the digital wallet of user 114. Moreover, the details associated with incentive 130 that may provide the necessary information to allow incentive application 118 to store incentive 130 in the digital wallet may be included in at least one of the request to store incentive 130 or in the authentication response. Further, as shown in FIG. 3C, when incentive 130 is successfully added to a digital wallet of user 114, remote server 104 may send a notification 308 to client computing device 102 associated with user 114. In some embodiments, notification 308 may be sent as a short messaging service (SMS) message to a mobile phone associated with user 114 and included in account information 124. In other embodiments, notification 308 may be sent as an e-mail to an e-mail address associated with user 114 that may be included in account information 124. Further, notification 308 may be sent as a push notification to client computing device 102 through a payment, shopping, or other application installed on client computing device 102 and capable of communicating and interacting with remote server 104. User 114 may then be able to use, redeem, or apply incentive 130. In some embodiments, user 114 may be able to redeem, use, or apply incentive 130 when performing a transaction processed by remote server 104. In some embodiments, once user 114 has performed an initial authentication to establish a session, any incentive 130 may be added to the digital wallet either by a simple selection or request performed by user 114, or automatically upon detecting incentive 130 being displayed without requiring subsequent authentication by user 114 for the period of the session. In some embodiments, a session may persist as long as networked television 106 is powered on or for a predetermined time which may be from about five minutes to about three hours.

Moreover, although the example shown in FIG. 3 refers to claiming incentive 130 displayed on networked television 106, the example may be extended to other devices capable of receiving content 128, displaying content 128, overlaying incentive 130, and processing a request to add incentive 130 to a digital wallet. Such devices include a monitor of a desktop computing system, a laptop screen, a tablet computer, a smart phone, and wearable devices, such as a smart watch and a head mounted display (HMD).

Figure 4:
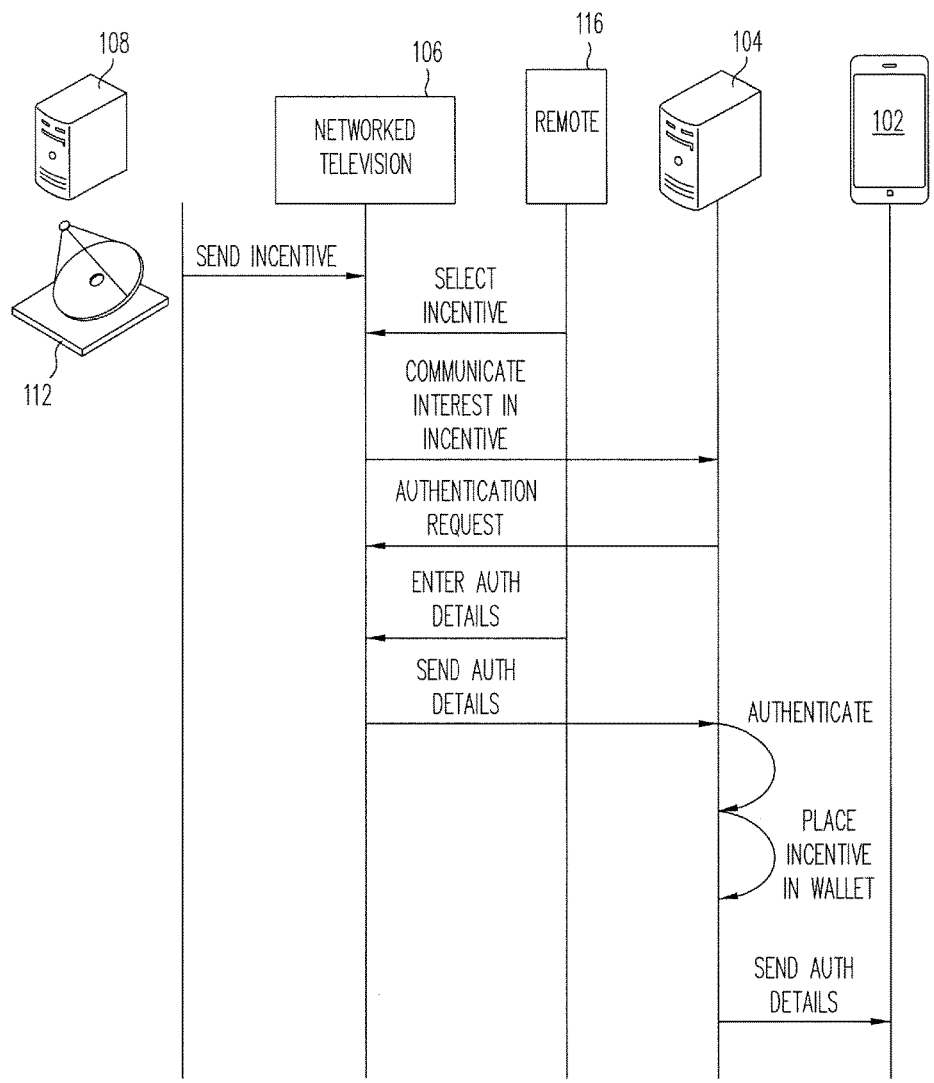
FIG. 4 is a diagram illustrating a flow of adding an incentive viewed by a user on a networked television to a digital wallet associated with the user, consistent with some embodiments.

FIG. 4 is a diagram illustrating a flow of adding an incentive viewed by user 114 on networked television 106 to a digital wallet associated with user 114, consistent with some embodiments. For the purpose of illustration, FIG. 4 may be described with respect to any of FIGS. 1-3. As shown in FIG. 4, networked television 106 may receive incentive 130 from content provider 112 or from incentive server 108. Incentive 130 may be displayed overlaying content 128 or as part of content 128. User 114 may then use remote control 116, for example, to select incentive 130 and request that incentive 130 be added to a digital wallet or other account associated with user 114. In some embodiments, when user 114 requests that incentive be added to a digital wallet or other account associated with user 114, networked television 106 may send a request over network 106 to remote server 104 which may host the digital wallet or other account to communicate interest in adding incentive 130 to a digital wallet associated with user 114. Remote server 104 may then send an authentication request to networked television 106. Authentication application 134 of networked television 106 may include instructions for displaying authentication interface 300 to user 114, and user 114 may use remote control 116 to enter authentication details into authentication interface 300. In some embodiments, user 114 may enter authentication details in other ways, such as by using client computing device 102 in direct communication with networked television 106 or in communication with networked television 106 over network 110. In embodiments when networked television 106 includes a touch screen, user 114 may enter authentication details using the touch screen.

Networked television 106 may then send the authentication details over network 110 to remote server 104. Authentication application 120 of remote server 104 may then authenticate user 114 using the provided authentication details and place incentive 130 in a digital wallet associated with user 114 when the authentication is successful. As described above, adding incentive 130 into a digital wallet associated with user 114 may include determining details of incentive 130 by parsing metadata associated with incentive 130, determining details through a URL or hyperlink associated with incentive 130, or analyzing an image of incentive 130. Moreover, the details associated with incentive 130 that may provide the necessary information to allow incentive application 118 to store incentive 130 in the digital wallet may be included in at least one of the request to store incentive 130 or in the authentication response. When incentive is successfully added to a digital wallet of user 114, remote server 104 may send a notification 308 to client computing device 102 associated with user 114 that may be an SMS message, an e-mail, a push notification, and the like. User 114 may then be able to use, redeem, or apply incentive 130. In some embodiments, user 114 may be able to redeem, use, or apply incentive 130 when performing a transaction processed by remote server 104.

Figure 5:
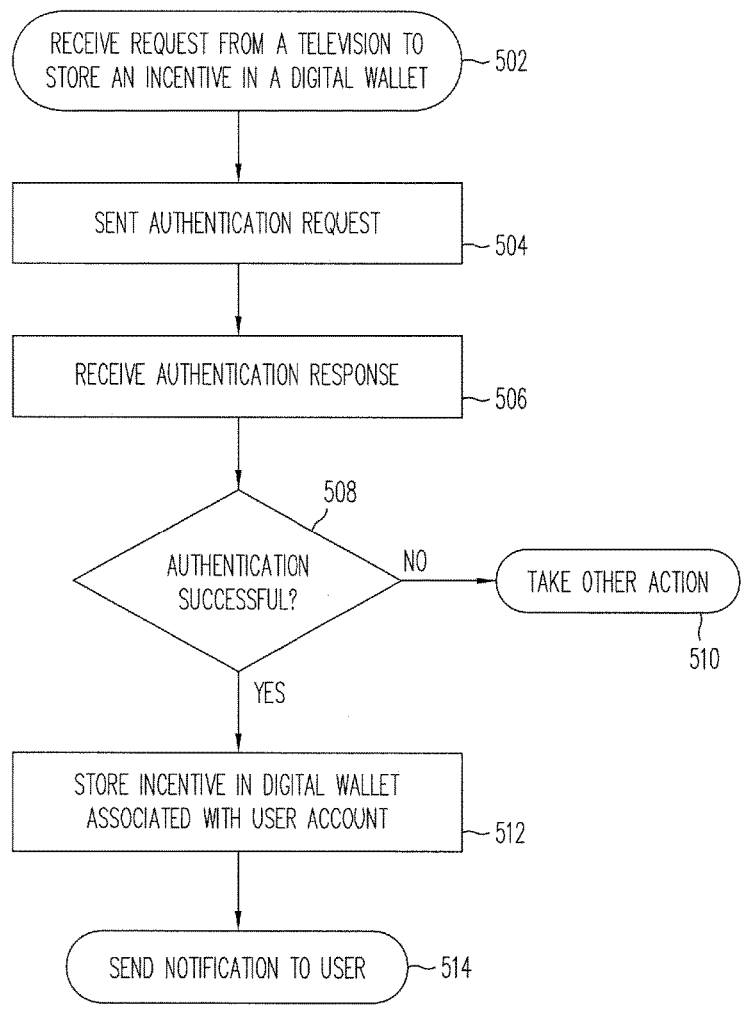
FIG. 5 is a flowchart illustrating a process for storing an incentive in a digital wallet associated with a user, consistent with some embodiments.

FIG. 5 is a flowchart illustrating a process 500 for storing incentive 130 in a digital wallet associated with user 114, consistent with some embodiments. For the purpose of illustration, FIG. 5 may be described with reference to any of FIGS. 1, 2, 3A-3C, and 4. Process 500 shown in FIG. 5 may be embodied in computer-readable instructions for execution by one or more processors such that the steps of process 500 may be performed by processing component 206 of remote server 104. In some embodiments, incentive application 118 and/or authentication application 120 of remote server 104 may include instructions for performing one or more steps of process 500. As shown in FIG. 5, process 500 begins when remote server 104 receives a request from networked television 106 to store incentive 130 in a digital wallet associated with user 114 (502). In some embodiments, incentive 130 may have been displayed on networked television 106 as part of content 128 or as an overlay on content 128. Moreover, user 114 may have selected incentive 130 for storage in a digital wallet using remote control 116, client computing device 102, or by touching a screen of networked television 106 when networked television 106 includes a touch screen.

When remote server 104 receives a request from networked television 106 to store incentive 130, or otherwise receives a message indicating interest in storing incentive 130, remote server 104 may send an authentication request to networked television 106 (504). In some embodiments, networked television 106 may include authentication application 134 that may include instructions for displaying authentication interface 300 to user 114 for providing authentication details. Remote server 104 may then receive an authentication response (506). In some embodiments, authentication details entered by user 114 into authentication interface 300 displayed by networked television 106 may be sent to remote server 104 in the authentication response. In some embodiments, user may enter the authentication details into authentication interface 300 using remote control 116, client computing device 102, or through a touch screen, if available.

Processing component 206 of remote server 104 may execute instructions included in authentication application 120 to determine if authentication details received in an authentication response are correct and the authentication is successful (508). In some embodiments, processing component 206 of remote server 104 may determine if the authentication is successful by determining if authentication details received in an authentication response match authentication details stored in account information 124 of user 114. If the authentication is not successful, authentication application 120 of remote server 104 may include instructions for taking another action (510). In some embodiments, taking another action may include requesting that user 114 re-enter the authentication details, requesting that user 114 provide a different form of authentication, increasing security on the account, temporarily suspending the account, and the like.

When the authentication is successful, incentive application 118 may include instructions for storing incentive 130 in a digital wallet associated with an account of user 114 (512). In some embodiments, account information 124 may include a digital wallet associated with user 114 and details of incentive 130 may be stored in the digital wallet. As described above, storing incentive 130 into a digital wallet associated with user 114 may include determining details of incentive 130 by parsing metadata associated with incentive 130, determining details through a URL or hyperlink associated with incentive 130, or analyzing an image of incentive 130. Moreover, the details associated with incentive 130 that may provide the necessary information to allow incentive application 118 to store incentive 130 in the digital wallet may be included in at least one of the request to store incentive 130 or in the authentication response. When incentive is successfully added to a digital wallet of user 114, remote server 104 may send a notification 308 to client computing device 102 associated with user 114 that may be an SMS message, an e-mail, a push notification, and the like (514). User 114 may then be able to use, redeem, or apply incentive 130. In some embodiments, user 114 may be able to redeem, use, or apply incentive 130 when performing a transaction processed by remote server 104.

Figure 6:
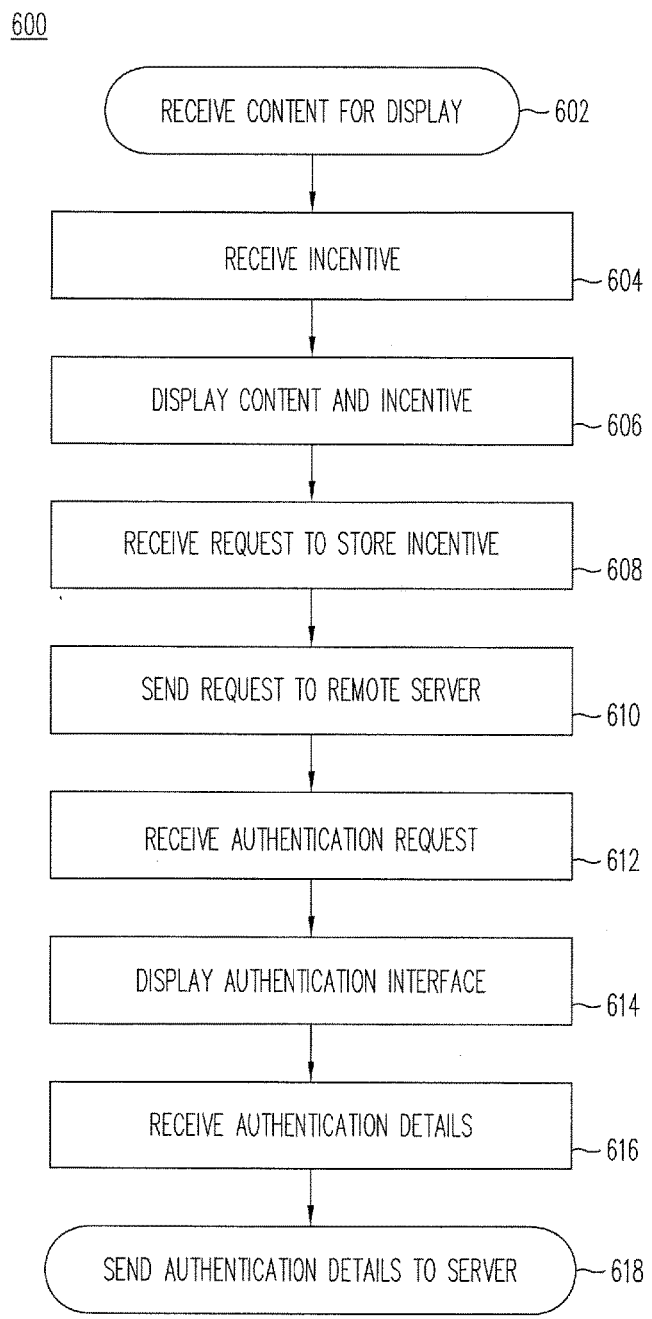
FIG. 6 is a flowchart illustrating a process for storing an incentive in a digital wallet associated with a user, consistent with some embodiments.

FIG. 6 is a flowchart illustrating a process 600 for storing incentive 130 in a digital wallet associated with user 114, consistent with some embodiments. For the purpose of illustration, FIG. 6 may be described with reference to any of FIGS. 1, 2, 3A-3C, and 4. Process 600 shown in FIG. 6 may be embodied in computer-readable instructions for execution by one or more processors such that the steps of process 600 may be performed by processing component 206 of networked television 106. In some embodiments, incentive application 136, authentication application 134, and/or content delivery application 138 of networked television 106 may include instructions for performing one or more steps of process 600. As shown in FIG. 6, process 600 begins when networked television receives content 128 (602) and incentive 130 (604) and displays content 128 and incentive 130 (606). In some embodiments, content 128 may be received from content provider 112 or from network 110, and incentive 130 may be received from incentive server 108 or from network 110, and may be displayed overlaying content 128 or as part of content 128.

Networked television 106 may then receive a request from user 114 to store incentive 130 (608) and send a request to store incentive 130 to remote server 104 (610). In some embodiments, the request from user 114 may be received by remote control 116. Moreover, in some embodiments, the request sent to remote server 104 may include details about incentive 130. Networked television 106 may then receive an authentication request from remote server 104 (612) and authentication application 134 may include instructions to display authentication interface 300 (614). Networked television 106 may then receive authentication details entered by user 114 into authentication interface 300 (616). In some embodiments, user 114 may enter the authentication details into authentication interface 300 using remote control 116. In some embodiments, user 114 may enter authentication details into client computing device 102 in direct communication with networked television 106 or in communication with networked television 106 over network 110. Networked television 106 may then provide the entered authentication details to remote server 104 (618). In some embodiments, networked television 106 may also provide details about incentive 130 to remote server 104 along with the entered authentication details.

Software, in accordance with the present disclosure, such as program code and/or data, may be stored on one or more machine-readable mediums, including non-transitory machine-readable medium. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

Embodiments consistent with this disclosure may provide systems and methods that allow a user to claim an incentive through a networked television using a remote control and add the incentive a digital wallet or other account associated with a provider through which the user can later use or redeem the incentive. The examples provided above are exemplary only and are not intended to be limiting. One skilled in the art may readily devise other systems consistent with the disclosed embodiments which are intended to be within the scope of this disclosure. As such, the application is limited only by the following claims.

What is claimed is:

1. A non-transitory computer-readable medium having stored thereon machine-readable instructions executable to cause a machine to perform operations comprising:
   providing incentive data associated with an incentive for display on a television, wherein the incentive is configured to be selected by a remote controller of the television, and wherein the incentive data comprises metadata comprising incentive details and instructions for displaying the incentive on the television;
   receiving, from the television, a selection, made by the remote controller, of the incentive, wherein the selection comprises the metadata and a request to store the incentive in a digital wallet maintained by an online payment processing service, the digital wallet being associated with a user account issued by the online payment processing service;
   generating an authentication request in response to receiving the selection, the authentication request requiring login credentials for the user account;
   sending the authentication request for display by the television;
   receiving an authentication response to the authentication request from the television through a client device, wherein the authentication response comprises data entered into the client device by a user associated with the user account;
   authenticating the user associated with the user account from the received authentication response;
   parsing, after the authenticating the user, the metadata to determine the incentive details;
   storing the incentive details in a database containing the digital wallet; and
   sending a storage notification to the client device.

2. The non-transitory computer-readable medium of claim 1, wherein the operations further comprise separately authenticating the user account when processing a transaction that redeems the incentive.

3. The non-transitory computer-readable medium of claim 1, wherein the metadata comprises a Uniform Resource Locator (URL) associated with the incentive.

4. The non-transitory computer-readable medium of claim 3, wherein the determining the incentive details comprises accessing the URL.

5. The non-transitory computer-readable medium of claim 1, wherein the request comprises a captured image of the incentive displayed on the television.

6. The non-transitory computer-readable medium of claim 1, wherein the metadata comprises a metadata tag.

7. The non-transitory computer-readable medium of claim 6, wherein the determining the incentive details comprises analyzing the metadata tag.

8. The non-transitory computer-readable medium of claim 1, wherein receiving the authentication response comprises receiving authentication information, and wherein the authenticating the user comprises matching the received authentication information with stored authentication information.

9. The non-transitory computer-readable medium of claim 8, wherein the received authentication information comprises at least one of a user identifier, a password, or a personal identification number (PIN).

10. The non-transitory computer-readable medium of claim 1, wherein the digital wallet is contained within the database of the online payment processing service and the incentive is received through an incentive server separate from the database.

11. A method, comprising:
providing, by a computer system of an online payment processing service, incentive data associated with an incentive for display on a television, wherein the incentive is configured to be selected by a remote controller of the television, and wherein the incentive data comprises metadata comprising incentive details and instructions for displaying the incentive on the television;
receiving, from the remote controller, a request to store the incentive in a digital wallet maintained by an online payment processing service, wherein the request comprises the metadata, and wherein the digital wallet is associated with a user account issued by the online payment processing service;
generating, by the computer system, an authentication request in response to receiving the request to store the incentive, the authentication request requiring login credentials for the user account;
sending, by the computer system, the authentication request for display by the television;
receiving, at the computer system from a client device, user authentication information corresponding to the user account, wherein the user authentication information comprises data entered by a user associated with the user account into the client device;
authenticating the user associated with the user account from the received user authentication information;
parsing, after the authenticating the user, the metadata to determine the incentive details;
storing the incentive details in a database of the computer system; and
sending a storage notification to the client device.

12. The method of claim 11, wherein the television comprises a display screen, a wireless network interface device, and a wireless receiver for remote control input.

13. The method of claim 11, wherein the request comprises a captured image of the incentive displayed on the television.

14. The method of claim 13, wherein the metadata comprises a Uniform Resource Locator (URL) associated with the incentive, and wherein the determining the incentive details comprises accessing the URL.

15. The method of claim 14, wherein receiving the authentication response comprises receiving authentication information, wherein the authentication is successful when the received authentication information matches stored authentication information.

16. The method of claim 14, wherein the determining the incentive details comprises analyzing the captured image.

17. The method of claim 11, wherein the incentive is received through an incentive server separate from the computer system.

18. The method of claim 11, wherein the user authentication information comprises a password.

19. A system, comprising:
a non-transitory memory; and
a hardware processor in communication with the non-transitory memory and configured to read machine-executable instructions from the non-transitory memory to cause the system to perform operations comprising:
providing incentive data associated with an incentive for display on a television, wherein the incentive is configured to be captured by a client device, and wherein the incentive data comprises metadata comprising incentive details and instructions for displaying the incentive on the television;
receiving, from the client device, a request to store the incentive in a digital wallet maintained by an online payment processing service, wherein the request comprises the metadata, and wherein the digital wallet is associated with a user account issued by the online payment processing service;
generating an authentication request in response to receiving the request to store the incentive, the authentication request requiring login credentials for the user account;
sending the authentication request for display by the television;
receiving an authentication response to the authentication request from the client device, wherein the authentication response comprises data entered by a user associated with the user account into the client device;
authenticating the user associated with the user account from the received authentication response;
parsing, after the authenticating the user, the metadata to determine the incentive details;
storing the incentive details in a database containing the digital wallet; and
sending a storage notification to the client device.

20. The system of claim 19, wherein the request comprises a captured image of the incentive displayed on the television.

* * * * *